US 6,662,994 B2

(12) United States Patent
Jankus

(10) Patent No.: US 6,662,994 B2
(45) Date of Patent: Dec. 16, 2003

(54) JIG FOR WELDING PIPE ENDS

(76) Inventor: Werner Jankus, Auf der Höhe 7, Herdecke (DE)

( * ) Notice: Subject to any disclaimer, the term of this patent is extended or adjusted under 35 U.S.C. 154(b) by 0 days.

(21) Appl. No.: 09/991,361

(22) Filed: Nov. 16, 2001

(65) Prior Publication Data

US 2002/0060236 A1 May 23, 2002

(30) Foreign Application Priority Data

Nov. 17, 2000 (DE) .......................................... 100 57 031

(51) Int. Cl.$^7$ ............................................. B23K 37/053
(52) U.S. Cl. ..................... 228/44.5; 228/49.3; 269/48.1
(58) Field of Search .............................. 228/212, 213, 228/44.5, 49.3, 49.5; 269/48.1

(56) References Cited

U.S. PATENT DOCUMENTS

| | | | | |
|---|---|---|---|---|
| 3,825,165 A | * | 7/1974 | Howell | 228/50 |
| 3,960,311 A | * | 6/1976 | Griffiths | 228/49.3 |
| 4,323,752 A | * | 4/1982 | Paton et al. | 219/101 |
| 4,465,220 A | | 8/1984 | Ledlow et al. | 228/50 |
| 4,648,544 A | * | 3/1987 | Puisais et al. | 228/44.5 |
| 5,484,973 A | * | 1/1996 | Gittens et al. | 219/74 |
| 5,538,173 A | | 7/1996 | Hummel | 228/44.5 |
| 5,609,291 A | * | 3/1997 | Hummel | 228/212 |

FOREIGN PATENT DOCUMENTS

| | | |
|---|---|---|
| DE | 3901022 | 7/1990 |
| DE | 39 01 022 A1 * | 7/1990 |
| DE | 9106163 | 9/1991 |
| JP | 11285896 | 10/1999 |

* cited by examiner

Primary Examiner—M. Alexandra Elve
Assistant Examiner—Len Tran
(74) Attorney, Agent, or Firm—Herbert Dubno; Andrew Wilford

(57) ABSTRACT

A jig for coaxially welding together a pair of generally coaxial tubular pipe ends meeting at a joint has a pair of support bodies in the pipe ends flanking the joint and each having an outer surface tapering axially inward toward the joint. Respective arrays of wedges are axially displaceable on the surfaces so that as the arrays are displaced apart the respective wedges move radially outward. Respective springs engaging the arrays urge the respective jaws radially together and urge the respective arrays axially toward each other. An abutment between the arrays has annular end faces engageable axially outward with the respective wedges. Thus when the bodies are drawn axially toward each other and the respective wedges are forced radially outward so that, when the arrays are flanking a joint and displaced radially outward, they coaxially center and lock together the pipe ends.

10 Claims, 3 Drawing Sheets

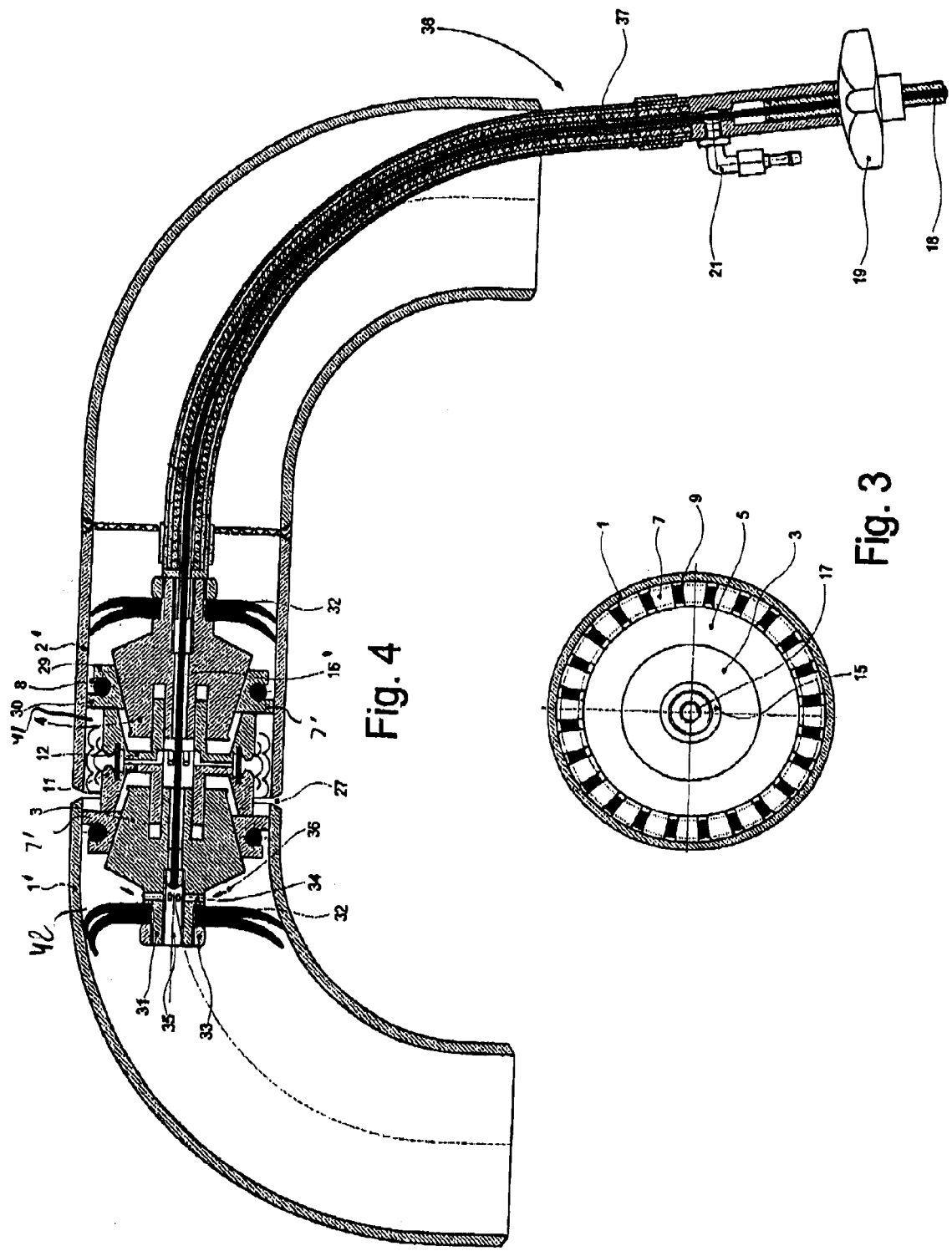

JIG FOR WELDING PIPE ENDS

FIELD OF THE INVENTION

The present invention relates to a jig for welding pipe ends. More particularly this invention concerns this invention concerns a device that fits inside a pair of pipe ends to be welded together and that holds them coaxial during the welding operation, normally while flooding the joint from inside with an inert gas.

BACKGROUND OF THE INVENTION

When a pair of pipe ends are to be welded coaxially together it is standard to use a jig that comprises a pair of parts that are fitted into the aligned pipe ends and then expanded radially. The pipe ends and jig parts are then fitted together so that the pipe ends are aligned perfectly coaxially and solidly held during the welding operation. Such a device as defined in the KWU product literature "Piping Systems" (July 1985).

This device is relatively complex to use and is quite expensive. It has a hydraulic actuator for spreading the two pairs of wedges and locking it in place, and involves separate pieces that must be installed separately. It is difficult to use and therefore takes considerable setup time.

OBJECTS OF THE INVENTION

It is therefore an object of the present invention to provide an improved pipe-end jig.

Another object is the provision of such an improved pipe-end jig which overcomes the above-given disadvantages, that is which is of simple construction and that is easy to use.

SUMMARY OF THE INVENTION

A jig for coaxially welding together a pair of generally coaxial tubular pipe ends meeting at a joint has according to the invention a pair of support bodies in the pipe ends flanking the joint and each having an outer surface tapering axially inward toward the joint. Respective arrays of wedges are axially displaceable on the surfaces so that as the arrays are displaced apart the respective wedges move radially outward. Respective springs engaging the arrays urge the respective jaws radially together and urge the respective arrays axially toward each other. An abutment between the arrays has annular end faces engageable axially outward with the respective wedges. thus when the bodies are drawn axially toward each other and the respective wedges are forced radially outward so that when the arrays are flanking a joint and displaced radially outward they coaxially center and lock together the pipe ends.

Thus with this system the two bodies are moved apart to bring the wedges inward so the jig can be fitted between two juxtaposed pipe ends. The bodies are them moved together to press the wedges against inner surfaces of the pipe ends and lock them coaxially together. Even if the two pipe ends are not of identical diameter, they will be coaxially centered and fixed relative to each other. After the jig is tightened to align the pipe ends, these ends can be welded together by conventional inert-gas welding or another process. Thereafter the bodies are moved together and the jig is pulled axially out of the joint.

According to the invention the abutment is formed with a pair of axially oppositely extending guides on which the respective bodies are axially slidable. These guides are axially extending tubes and the bodies are formed with axially inwardly open annular grooves complementarily receiving the respective guides.

The abutment according to the invention is formed by a pair of axially joined disks each having an axially extending outer flange forming the respective end face. It is formed with at least one radially outwardly open passage through which an inert gas can be fed into a space defined between the arrays and within the pipe ends at the joint. A fine-pore diffuser covers an outer end of the passage.

The wedges in accordance with the invention are formed with radially outwardly open seats. The springs are annular and engaged in the seats of the respective arrays. In a system for use in curved pipes, the wedges have inner edge portions and outer edge portions and the inner edge portions extend radially outward farther than the respective outer edge portions.

Each body is formed at an inner end of the respective frustoconical surface with a radially outwardly projecting stop lip. In addition the drawing-together means comprises an outer tube connected to one of the bodies, an inner element connected to the other of the bodies, and means for relatively shifting the outer tube and inner element. The tube and inner element can be rigid or flexible.

BRIEF DESCRIPTION OF THE DRAWING

The above and other objects, features, and advantages will become more readily apparent from the following description, reference being made to the accompanying drawing in which:

FIGS. 2 and 3 are sections taken along respective lines II—II and III—III of FIG. 1; and FIG. 4 is an axial section through another arrangement in accordance with the invention.

SPECIFIC DESCRIPTION

Figure 1:
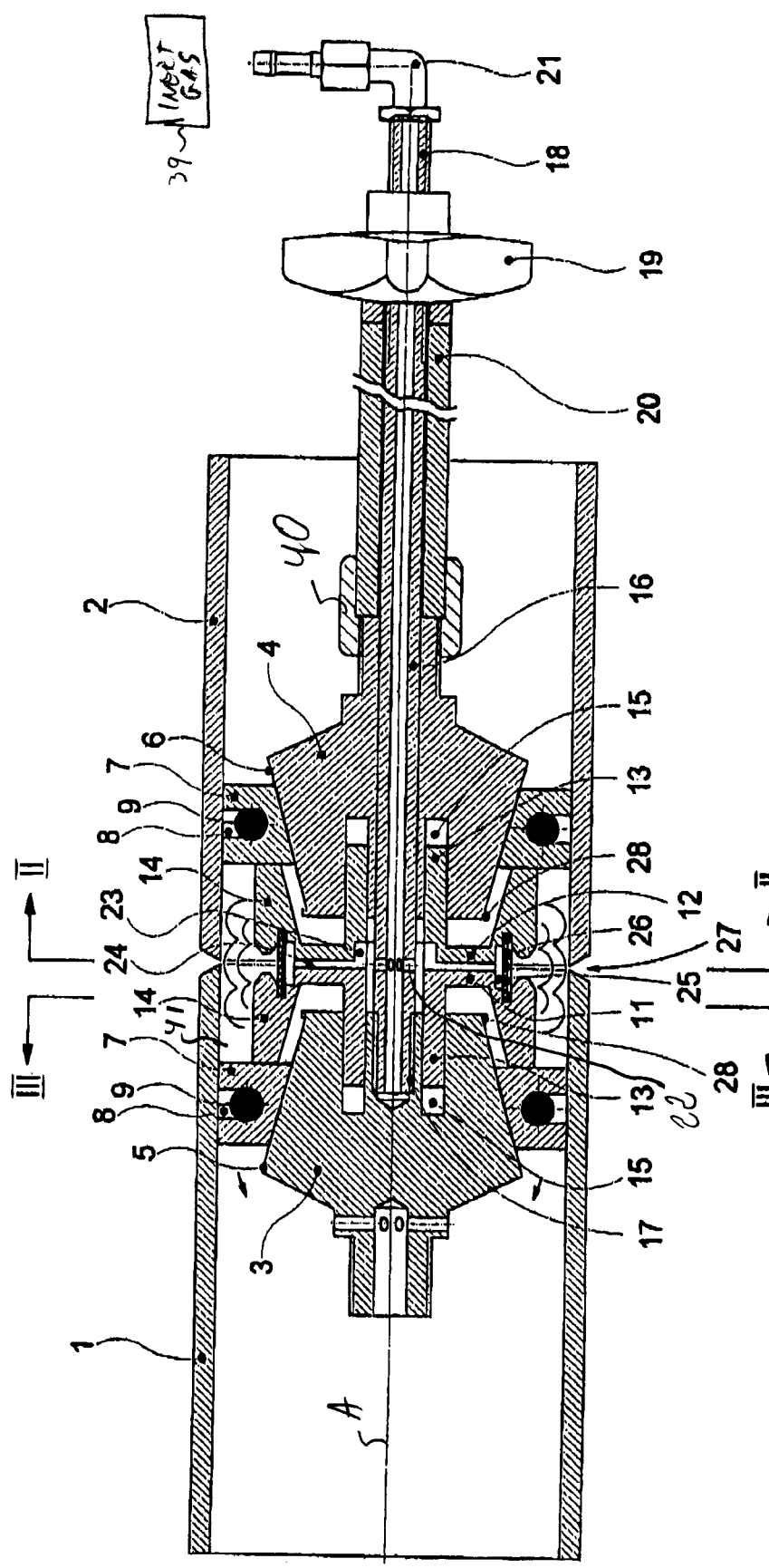
FIG. 1 is a partly diagrammatic axial section through the jig according to the invention.
Figure 2:
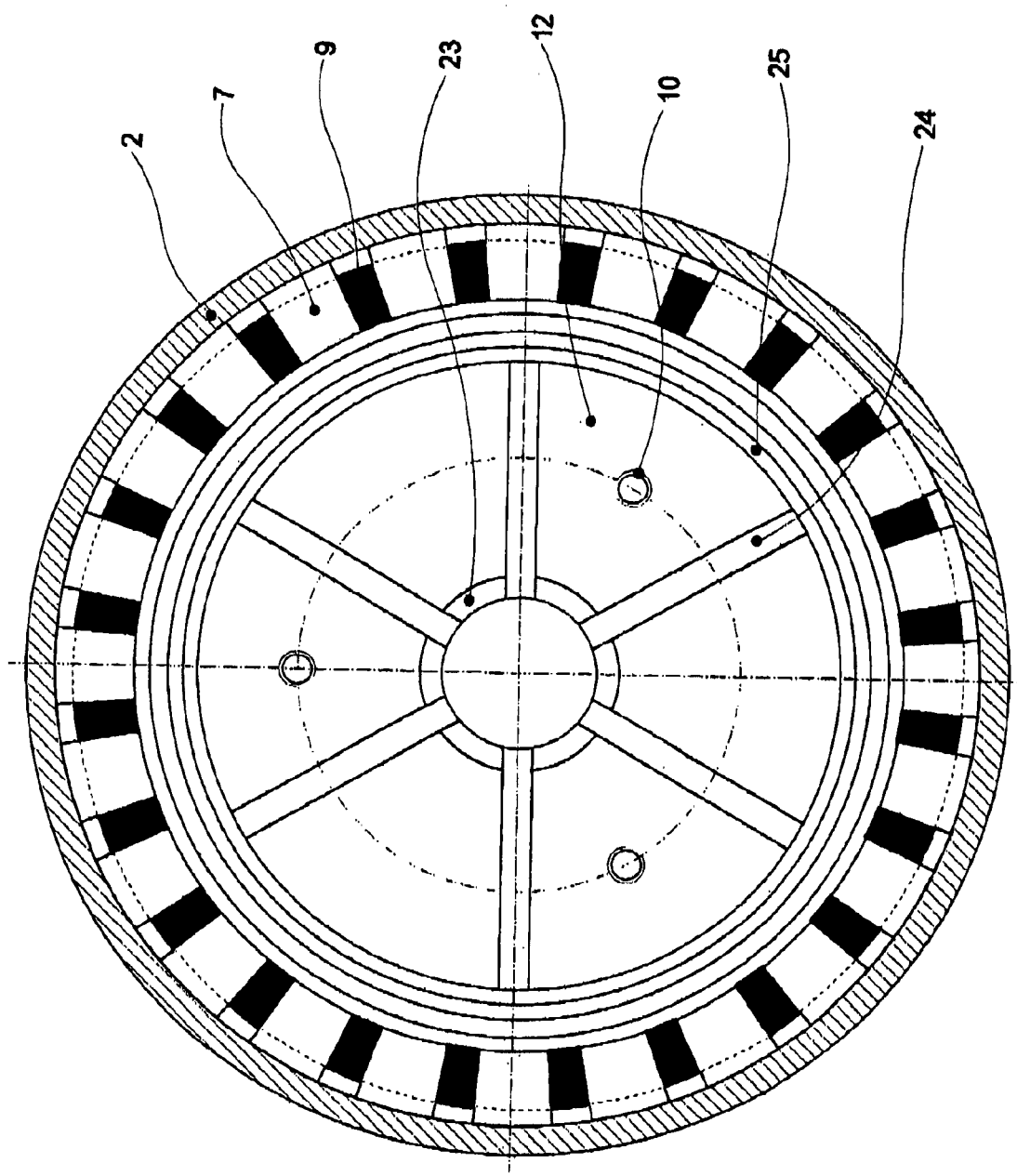

As seen in FIGS. 1 through 3, a pair of cylindrically tubular tube ends 1 and 2 are aligned end-to-end with their axes lying on a common axis A. A pair of generally identical support bodies 3 and 4 have respective frustoconical outer surfaces 5 and 6 flared away from each other and also centered on the axis A, with the body 3 lying in the tube end 1 and the body 4 in the tube end 2 which are separated at a joint 27 at which they are to be welded together. Each outer surface 5 and 6 carries a respective array of twelve wedges 7 each formed with an outwardly open groove 8 in which lies a spring here constituted as a ring 9, for instance made of a durable fluorinated rubber such as Viton®, that urges them radially together and, hence, axially inward toward the joint gap 27.

Between the bodies 3 and 4 are a pair of plates 11 and 12 extending perpendicular to the axis A and secured together by bolts 10 (FIG. 2). These plates 11 and 12 are formed with inner axially oppositely extending guide sleeves 13 and coaxial outer guide sleeves 14. The sleeves 13 fit in complementary axially inwardly open annular guide grooves 15 formed in the bodies 3 and 4 and the sleeves 14 can bear axially against axial inner faces of the wedges 7. Thus the bodies 3 and 4 can move axially relative to each other, being maintained perfectly coaxial by the inner guide sleeves 13. Similarly the sleeves 14 maintain a certain minimal axial spacing between the arrays of wedges 7.

An inner tube 16 has an inner end threaded into an axially inwardly open seat 17 formed in the body 3 while the body 4 can slide axially on this inner tube 16. An outer end 18 of this tube 16 is connected via a fitting 21 to a source 39 of compressed inert gas, for instance argon. The interior of the inner tube 15 opens via bores 22 into a space 23 in turn communicating via passages 24 extending radially through the plate assembly 11, 12 with a space 25. A fine-pore diffuser 26 covering the space 25 allows gas therein to flow smoothly outward therefrom to this space 25 at the interior of the joint 27.

An outer tube 20 is axially braced by a nut 19 against the inner tube 16 and is fixed via a nut 40 to the other body 4. Thus rotation of this nut 19 in one direction can move the bodies 3 and 4 toward each other and opposite rotation moves them apart. Abutment lips 28 on the inner ends of the surfaces 5 and 6 prevent the arrays of wedges 7 from slipping off the respective bodies 3 and 4.

This device is used as follows:

To start with the nut 19 is loosened so that the two bodies 3 and 4 can move apart and the arrays of wedges 7 can move axially toward each other while the individual wedges 7 move radially inward. Then the device is inserted through the tube 2 into the normally fixed tube 1 until the body 3 is past the joint 27 and the body 4 is still in the tube 2.

The nut 19 is then tightened to push the two bodies 3 and 4 together, thereby causing the wedges 7. to be forced by the sleeves 14 up the surfaces 5 and 6 until they enter into solid contact with the inner wall surface of the respective pipe ends 1 and 2, automatically aligning them coaxially and fixing the tube end 2 relative to the tube end 1. Even if one of the tube ends 1 or 2 is of a slightly different diameter than the other, the two tube ends 1 will be set perfectly coaxial to each other.

Inert gas is then forced into the space 41 axially delimited between the arrays of wedges 2, radially inward by the sleeves 14, and radially outward by the tube ends 1 and 2. The ends 1 and 2 are then welded together, the inert gas preventing unwanted oxidation. Once the weld is complete, the nut 19 is loosened to allow the wedges 7 to retract from contact with the pipe ends 1 and 2 and the device is pulled out.

In FIG. 4, where reference numerals from FIGS. 1 through 3 are used for structurally or functionally identical structure, the two tube ends 1' and 2' are on elbows and outer portions 20 of the wedge 7' have short outer portions 29 and long inner portions 30 to allow the device to move around a corner. Instead of a pair of rigid coaxial tubes 16 and 20, a bowden arrangement 38 is used comprising a flexible core 16' surrounded by a flexible sleeve 37.

Each body 3 and 4 has an axially outwardly projecting threaded stem 31 on which is mounted a pair of flexible elastomeric seal disks 32 held in place by a nut 33. A blind end bore 35 opens via passages 34 into a space 42 defined axially inwardly by the respective body 3 and its wedges 7, axially outwardly by the respective disks 32, radially outwardly by the respective tube end 1', and radially inwardly by the respective body 3. The end of the passage 34 is open at 35 into the tube 1'. Thus as an inert gas is pumped via the fitting 21 through the sleeve 37 into the space 41, it can flow between the wedges 7' of the body 3 and then as shown by arrows 36 down into the passage 35 and out, ensuring excellent flushing of the space 41.

I claim:

1. A jig for coaxially welding together a pair of generally coaxial tubular pipe ends meeting at a joint, the jig comprising:

a pair of support bodies in the pipe ends flanking the joints, formed with axially inwardly open annular grooves, and each having an outer surface tapering axially inward toward the joint;

respective arrays of wedges axially displaceable on the surfaces, whereby as the arrays are displaced apart the respective wedges move radially outward;

respective springs engaging the arrays, urging the respective jaws radially together, and urging the respective arrays axially toward each other;

an abutment between the arrays having annular end faces engageable axially outward with the respective wedges and formed with a pair of axially oppositely extending guide tubes fitting complementarily in the grooves and on which the respective bodies are axially slidable;

means for drawing the bodies axially toward each other and thereby forcing the respective wedges radially outward.

2. The pipe-welding jig defined in claim 1 wherein the abutment is formed by a pair of axially joined disks each having an axially extending outer flange forming the respective end face.

3. The pipe-welding jig defined in claim 1 wherein the abutment is formed with at least one radially outwardly open passage, the jig further comprising:

means for feeding an inert gas through the passage radially outward into a space defined between the arrays and within the pipe ends at the joint.

4. The pipe-welding jig defined in claim 3 further comprising:

a fine-pore diffuser covering an outer end of the passage.

5. The pipe-welding jig defined in claim 1, wherein the wedges are formed with radially outwardly open Beats, the springs being annular and engaged in the seats of the respective arrays.

6. The pipe-welding jig defined in claim 1 wherein the wedges have inner edge portions and outer edge portions and the inner edge portions extend radially outward farther than the respective outer edge portions.

7. The pipe-welding jig defined in claim 1 wherein each body is formed at an inner end of the respective frustoconical surface with a radially outwardly projecting stop lip.

8. A jig for coaxially welding together a pair of generally coaxial tubular pipe ends meeting at a joint, the jig comprising:

a pair of support bodies in the pipe ends flanking the joint and each having an outer surface tapering axially inward toward the joint;

respective arrays of wedges axially displaceable on the surfaces, whereby as the arrays are displaced apart the respective wedges move radially outward;

respective springs engaging the arrays, urging the respective jaws radially together, and urging the respective arrays axially toward each other;

an abutment between the arrays having annular end faces engageable axially outward with the respective wedges;

an outer tube connected to one of the bodies;

an inner element connected to the other of the bodies; and means for relatively shifting the outer tube and inner element axially toward each other and forcing the respective wedges radially outward.

9. The pipe-welding jig defined in claim 8 wherein the tube and inner element are rigid.

10. The pipe-welding jig defined in claim 8 wherein the tube and inner element are flexible.

* * * * *